United States Patent
Ferrone

(10) Patent No.: US 9,077,134 B2
(45) Date of Patent: Jul. 7, 2015

(54) GROUNDING SYSTEM FOR A HEATED HOSE

(71) Applicant: Sykes Hollow Innovations, Ltd., Manchester Center, VT (US)

(72) Inventor: William Ferrone, Pawlet, VT (US)

(73) Assignee: Sykes Hollow Innovations, Ltd., Manchester Center, VT (US)

( * ) Notice: Subject to any disclaimer, the term of this patent is extended or adjusted under 35 U.S.C. 154(b) by 399 days.

(21) Appl. No.: 13/648,467

(22) Filed: Oct. 10, 2012

(65) Prior Publication Data
US 2013/0091700 A1    Apr. 18, 2013

Related U.S. Application Data

(63) Continuation of application No. 12/387,750, filed on May 6, 2009, now Pat. No. 8,291,939.

(51) Int. Cl.
| | |
|---|---|
| *H01R 43/00* | (2006.01) |
| *A01K 7/02* | (2006.01) |
| *F16L 53/00* | (2006.01) |
| *F24H 1/14* | (2006.01) |
| *F24H 9/20* | (2006.01) |

(52) U.S. Cl.
CPC ............ *H01R 43/00* (2013.01); *Y10T 29/49169* (2015.01); *Y10T 29/49117* (2015.01); *A01K 7/027* (2013.01); *F16L 53/008* (2013.01); *F24H 1/142* (2013.01); *F24H 9/2028* (2013.01)

(58) Field of Classification Search
CPC ....... H01R 43/00; F24H 1/142; F24H 9/2028; F16L 53/008; Y10T 29/49169; Y10T 29/49117
USPC ........ 29/507, 508; 138/33, 109; 219/534, 535
See application file for complete search history.

(56) References Cited

U.S. PATENT DOCUMENTS

| | | | |
|---|---|---|---|
| 1,809,714 A | 6/1931 | Mathews | |
| 2,430,921 A | 11/1947 | Edelmann | |
| 2,516,864 A | 8/1950 | Gilmore et al. | |
| 2,585,443 A | 2/1952 | Cox | |
| 2,793,280 A * | 5/1957 | Harvey | .......................... 137/341 |
| 3,378,673 A * | 4/1968 | Hopper | .......................... 392/472 |

(Continued)

OTHER PUBLICATIONS

James F. Hook, USPTO Office Action, U.S. Appl. No. 12/387,750, Notification Date Apr. 29, 2011, 7 pages.

(Continued)

*Primary Examiner* — Christopher M Koehler
(74) *Attorney, Agent, or Firm* — Hoffman Warnick LLC

(57) ABSTRACT

A method of forming a grounded electrical circuit in a heated hose is provided. In one embodiment, the method includes: positioning a ground wire, a first heating wire, and a second heating wire axially within an inner wall of the hose; removing the end portions of the heated hose, such that end portions of the first heating wire, the second heating wire, and the ground wire are exposed; and positioning a ring around the first end portion of the hose. Exposed end portions of the first and second heating wires are folded to be positioned axially along an outer surface of the hose body. The exposed end portion of the grounding wire is folded radially inward, such that the grounding wire is positioned axially along an inner surface of the inner wall and against the ring. A stem of a first fluid coupling is inserted into the first end portion of the heated hose, such that the stem contacts the exposed end portion of the grounding wire.

7 Claims, 8 Drawing Sheets

(56) References Cited

U.S. PATENT DOCUMENTS

| | | | |
|---|---|---|---|
| 3,548,158 A | | 12/1970 | McCaskill |
| 4,038,519 A | | 7/1977 | Foucras |
| 4,194,536 A | | 3/1980 | Stine et al. |
| 4,214,147 A | | 7/1980 | Kraver |
| 4,455,474 A | * | 6/1984 | Jameson et al. ............ 392/472 |
| 4,553,023 A | * | 11/1985 | Jameson et al. ............ 392/472 |
| 4,616,894 A | * | 10/1986 | Baker ........................ 439/192 |
| 4,874,925 A | | 10/1989 | Dickenson |
| 5,279,333 A | * | 1/1994 | Lawrence .................... 138/121 |
| 5,791,377 A | * | 8/1998 | LaRochelle .................. 138/33 |
| 6,049,658 A | | 4/2000 | Schave et al. |
| 6,738,566 B2 | | 5/2004 | Pagnella |
| 7,120,354 B2 | | 10/2006 | Mackie et al. |
| 8,028,721 B2 | | 10/2011 | Koskey, Jr. |
| 8,291,939 B2 | | 10/2012 | Ferrone |
| 2013/0091700 A1 | | 4/2013 | Ferrone |

OTHER PUBLICATIONS

James F. Hook, USPTO Final Office Action, U.S. Appl. No. 12/387,750, Notification Date Oct. 19, 2011, 7 pages.

James F. Hook, USPTO Office Action, U.S. Appl. No. 12/387,750, Notification Date Mar. 7, 2012, 8 pages.

James F. Hook, USPTO Notice of Allowance and Fee(s) Due, U.S. Appl. No. 12/387,750, Date Mailed Jun. 20, 2012, 5 pages.

Hook, Office Action Communication for U.S. Appl. No. 13/657,106, filed Dec. 26, 2013, 11 pages.

Hook, Notice of Allowance and Fee(s) Due for U.S. Appl. No. 13/657,106, filed Sep. 2, 2014, 5 pages.

* cited by examiner

GROUNDING SYSTEM FOR A HEATED HOSE

CROSS REFERENCE TO RELATED APPLICATIONS

This application is a continuation application of U.S. patent application Ser. No. 12/387,750 filed on May 6, 2009, entitled "Grounding System For A Heated Hose," which is incorporated herein in its entirety and the benefit and priority thereof which are hereby claimed.

BACKGROUND OF THE INVENTION

The present disclosure relates in general to water or "garden" hoses and in particular to an electrically heated flexible elastomeric or rubber hose which carries an electrical cord for powering heating elements embedded in the hose wall.

DESCRIPTION OF PRIOR DEVELOPMENTS

A water delivery problem can arise in colder climates where the temperature falls below the freezing temperature of water. For example, farmers need to supply water to livestock in the field, building contractors need to supply water to outdoor worksites and homeowners need water to wash cars and other equipment during winter months, as well as year round in some very cold climates.

Presently, livestock is watered by transporting water from an indoor faucet to remote livestock water troughs in the field. This is done with hand carried buckets or by motor vehicle. This is laborious and time consuming.

Prior attempts to provide water in cold weather include wrapping stationary water pipes with heat tape and insulation and providing localized 110 volt electric heaters or gas heaters on water conduits, containers and troughs. In some cases, water pipes are buried deep underground below the frost line and connected to frost free hydrants. These prior approaches and apparatus are relatively expensive, complicated to set up and use, bulky and generally difficult if not impossible to reposition and move around.

What is needed is a convenient, inexpensive and easily portable system to prevent water from freezing within hoses in virtually any cold environment. A further need exists for an economical hose of simple construction which is heated by widely available electrical power such as 110 volt AC power available from standard electrical wall outlets. Yet a further need exists for a convenient source of electrical power available at the end of a hose to allow a user to power electrical equipment, hardware and tools including saws, drills and the like and electrical appliances such as livestock grooming equipment as well as electrical water tank heaters for preventing water within a water tank from freezing.

A safe, reliable, easy-to-assemble, and low cost electrical grounding system is further needed to meet safety standards and provide a robust grounding circuit.

SUMMARY OF THE INVENTION

The present invention has been developed to meet the needs noted above by providing a flexible garden hose having an integral resistance heater and a standard electrical extension cord. This construction has the advantages of allowing water to flow at temperatures below its freezing point, and facilitating the electrical connection of 110 volt AC power to electrical equipment located adjacent the end of the heated hose.

A durable flexible rubber or plastic elastomeric hose, similar to automotive radiator hose, is provided with a flexible resistance heater wire, electrical power conductors and a heat insulating cover or jacket. In one embodiment, the heater wire and electrical power conducting lead wires are molded or otherwise embedded within the walls of the hose.

The electrical heater wire or wires are advantageously molded, extruded or otherwise embedded within an inner layer of the hose adjacent the hollow core of the hose. An electrical power cord may be molded, extruded or otherwise embedded within an outer heat insulating layer of the hose.

Another embodiment of the invention eliminates the heater wire, but includes the electrical power leads such that the hose acts as both a water hose and an electrical extension cord. Alternatively, the electrical power leads can be eliminated and only the resistance heater wire or wires are provided along substantially the full length of the hose.

Various ratings of heating wire maybe provided for adapting the amount of heat produced along a given length of hose so as to provide just enough heat to keep water flowing at various ambient temperatures below freezing. Alternatively, the heater wire can be selected to raise the temperature of the water to a warm or hot temperature, as required for bathing animals on cold days.

The subject invention is particularly useful to livestock owners, pet owners, pet groomers and homeowners as well as outdoor contractors such as concrete contractors and pressure washer contractors and operators. A particularly beneficial use of the invention is to provide water to a remote livestock water tank with an above-ground, heated, frost-free, flexible garden hose and to provide electrical power to a water tank heater to prevent the water in the livestock water tank from freezing.

Another embodiment of the disclosure is directed to a simple to assemble grounding system that employs standard hose couplings as integral components of the grounding circuit. A circumferentially-notched ring or ferrule is mounted on each end portion of the hose. The notches in the ferrule allow the loose ends of the heating wires and grounding wire to engage and seat upon the relatively soft rubber or elastomeric hose material at the ends of the hose. This arrangement reduces the possibility of undesirable contact and abrasion between the relatively rigid ferrules and the insulation surrounding the heating wires.

After the ferrules are mounted to the opposite ends of the hose, a thermostat is electrically connected to two stripped ends of two of the heating wires at one end of the hose. The "hot" and "neutral" wires of a standard power cord are electrically connected to the same two heating wires at the other end of the hose. The end portions of these two powered heating wires are then folded back over the exterior of the rings or ferrules. A third heating wire or other electrically conductive wire extending along the length of the hose has stripped or bare ends. One stripped end is folded into the hose channel against the inner wall of the hose at one end while the other stripped end is connected to the ground wire on the power cord at the other end of the hose.

Heat shrinkable sleeves, tape or other electrically insulating and waterproof material is applied over the folded ends of the other two powered wires so as to tightly cover or wrap the wires and the thermostat against one end of the hose and to tightly wrap or cover the wires and their connection with the hot and neutral leads of the power cord at the other end of the hose.

The rings or ferrules are provided with circumferentially-spaced axially extending cut-out portions or notches. The folded-back ends of the heating wires are aligned over and within the notches so that the bends or folds in the wires engage the relatively soft elastomeric or rubber hose material along each opposite end face of the hose. The third wire serving as the ground wire has its other end (opposite the end folded into the interior of the hose) folded radially outwardly over a notch in a ferrule and then connected to the ground wire of a power cord or alternatively connected to the ground wire of a power cord and then folded into the flow channel with the power cord ground wire seated in the notch. Again, the notch provides for a soft seat for the wire at its fold over the end face of the hose. This protects the wire from rubbing, abrasion and cutting against the edge of the ring or ferrule and helps to hold the wire in place.

After the ends of all the external wires overlying the ferrules are covered with an electrically-insulating waterproof sleeve, male and female hose couplings such as the type found on common garden hoses, are provided at opposite ends of the hose. Each coupling has a tubular axial stem that is freely insertable into each respective end of the hose. Once the tubes or stems are inserted into the open ends of the hose, an expansion tool, such as an axially-tapered mandrel is inserted axially into each coupling so as to radially-outwardly expand each tube or stem.

This radial expansion of the tubes or stems radially compresses and clamps the ends of the ground wire between the stems and ferrules and forms an electrical ground connection extending from one coupling to the other along the full length of the hose. The radial compression of the ends of the resilient hose caused by the expanded stems acts in the manner of a lock washer to maintain a tight radial clamping force. This assembly is very easy to complete, uses a minimum of components, meet safety standards and is capable of withstanding the rigors of strenuous outdoor applications such as found on construction sites and farms.

Various other objects, features and attendant advantages of the present invention will be more fully appreciated as the same becomes better understood from the following detailed description when considered in connection with the accompanying drawings, in which like reference characters designate like or corresponding parts through the several views.

DESCRIPTION OF THE PREFERRED EMBODIMENTS

Figure 1:
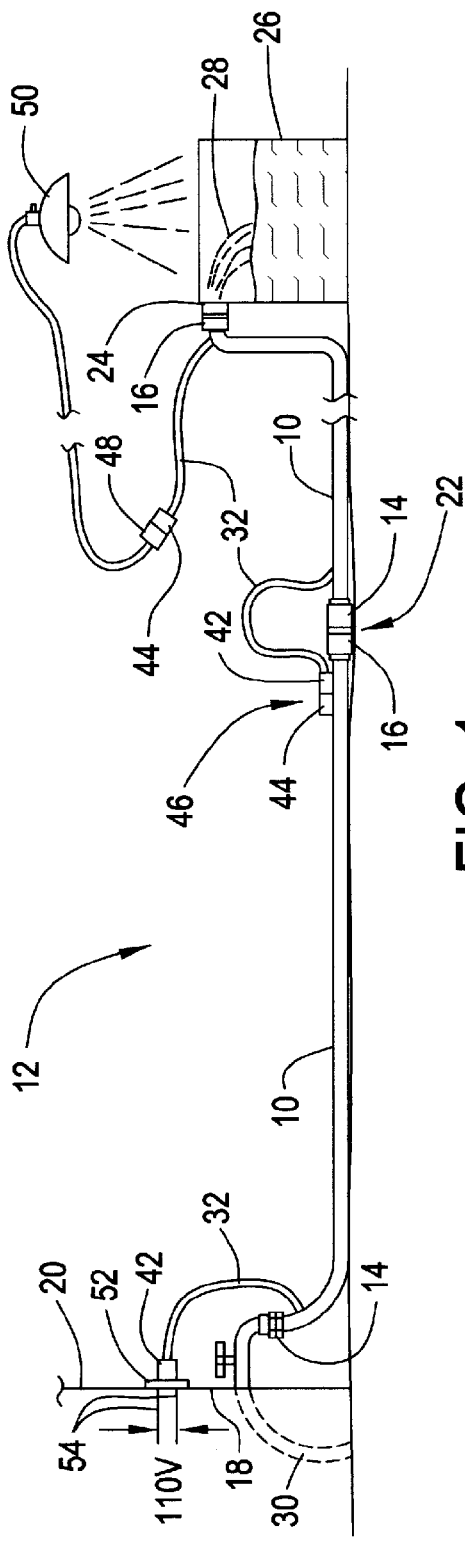
FIG. 1 is a schematic view of one embodiment of the invention adapted to power and illuminate an outdoor light and fill an outdoor water trough with water.

The present invention will now be described in conjunction with the drawings, beginning with FIG. 1 which shows a pair of interconnected hose segments 10. These segments are constructed and interconnected in accordance with the present invention so as to form a segmented hose system 12. Each hose segment 10 is fitted on one end with a conventional, annular, internally-threaded female brass hose socket or coupling 14, and on each opposite end with a conventional, annular, externally-threaded male brass hose plug or coupling 16.

One of the female hose sockets 14 on a first hose segment 10 is shown threaded to a standard outdoor spigot 18 mounted to an exterior wall 20 of a building. The male hose plug 16 on the other end of the first hose segment 10 is shown screwed into the female hose socket 14 of the other or second hose segment 10 to form a watertight interconnection 22. The male hose plug 16 on the opposite end of the second hose segment is shown screwed into a fitting 24 on a water tank or water trough 26.

The hose system 12 allows water 28 to flow along the entire length of the interconnected hose segments 10, 10 and into tank 26. For example, water from a public water line, well, tank or other source is fed through water line 30, through open spigot 18, through the first and second hose segments 10, 10, across interconnection 22 and into tank 26. Of course, the system 12 may be connected to an end application other than a tank. For example, the system 12 may be connected to a valve or spray nozzle commonly used with garden hoses, or to a power washer or other water-using apparatus.

Figure 2:
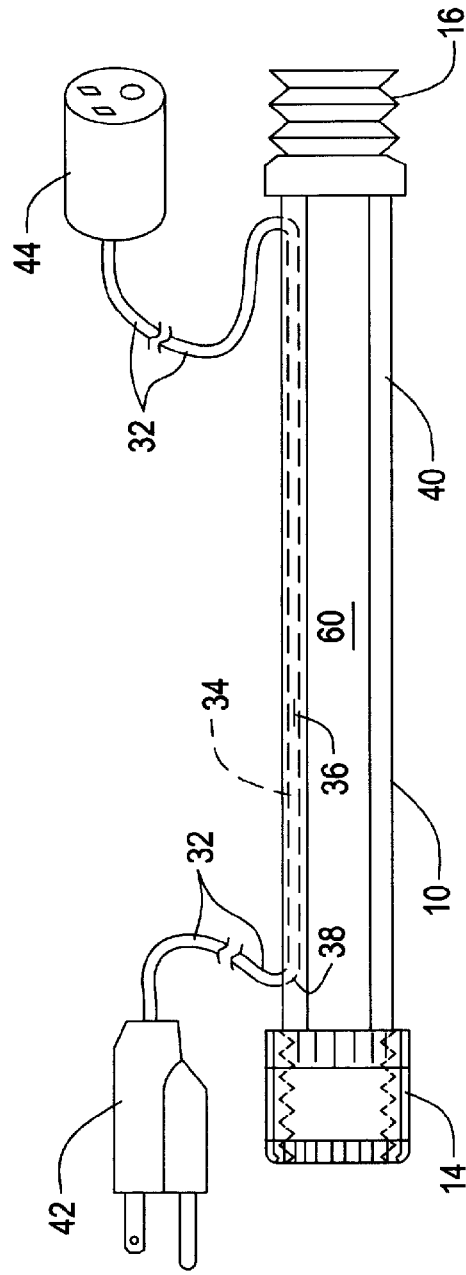
FIG. 2 is a schematic side view of a section of hose adapted with an integral electrical extension cord.

As further seen in FIG. 1, each hose segment 10 is provided with an electrically insulated power cord 32, which, as seen in FIG. 2, extends along substantially the entire length of each hose segment 10. Power cord 32 is shown as a conventional extension power cord having a "hot" current carrying lead wire 34, a "neutral" lead wire 36 and an optional ground wire 38, as discussed further below.

Preferably, the wires 34, 36 and 38 are insert molded, extruded or otherwise embedded within the flexible wall 40 (FIG. 2) of each hose segment 10. It is convenient to extend at least one end of each power cord 32 at least several feet, for example, up to three feet or more beyond the end of each hose segment 10. In FIG. 1, power cord 32 extends over three feet from its exit point from hose wall 40 adjacent each female socket 14 and terminates in a standard two or three prong outdoor electrical plug 42.

A standard two or three socket outdoor electrical socket 44 is connected to the opposite end of each power cord 32. Socket 44 can be closely fitted and fixed to the exterior of hose 10 adjacent each male hose coupling 16, as shown in FIG. 1 adjacent interconnection 22. Alternatively, socket 44 can be located several feet or more beyond each male hose coupling 16 as further shown in FIGS. 1 and 2.

In use, all watertight connections are made with hose sockets 14 and hose plugs 16 such as shown in FIG. 1. Electrical connections between male and female electrical plug and socket connectors 42, 44 are then made to form an electrical interconnection 46 adjacent hose interconnection 22.

An arch or loop is formed around hose interconnection 22 by an end portion of power cord 32 on the second hose segment 10 connected to tank 26. In this manner, the end of the power cord 32 loops around and is separated and spaced apart from the hose interconnection 22. A conventional male electrical plug 48 on an external or remote electrical appliance such as outdoor light 50 is connected to the female electrical connector 44 adjacent tank 26. The male electrical plug 42 adjacent spigot 18 is then plugged into a conventional electrical wall outlet 52 mounted on building wall 20 so as to receive electrical power from electrical power lines 54. Appliance 50 can then be switched on and off remotely from wall outlet 52 so as to illuminate tank 26. Of course, virtually any other electrical apparatus can be operated in place of light 50 such as an electric heater for heating the water 28 in the tank 26 and preventing the water from freezing.

Figure 3:
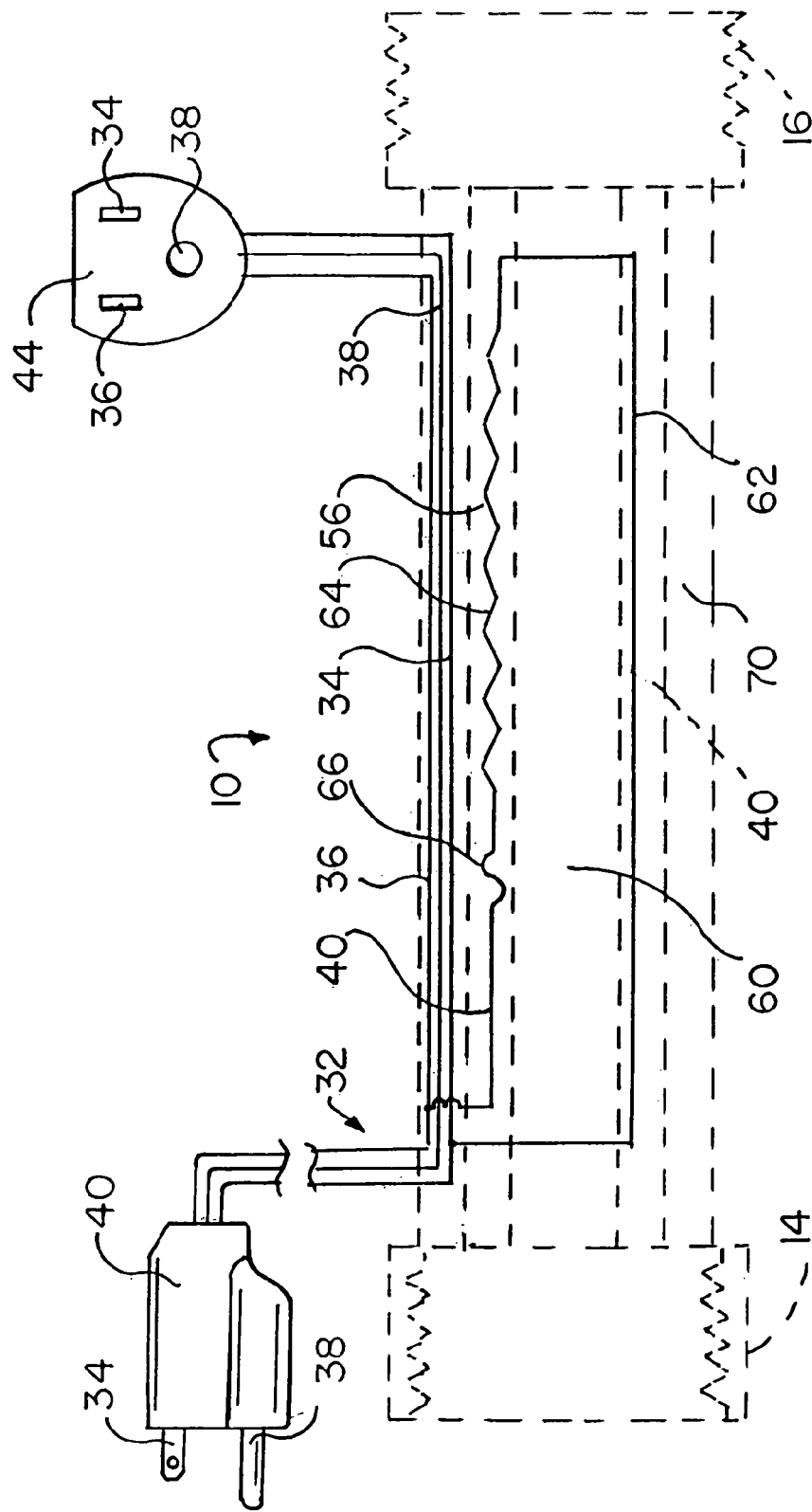
FIG. 3 is a schematic side view of an alternate embodiment of the invention showing the electrical connections between the electrical power leads, and depicting the hose in phantom for the purpose of clarity.

Another embodiment of the invention is shown in FIG. 3 wherein hose segment 10 is further provided with an electrical resistance heating element 56 such as a nichrome wire. The general exterior configuration of system 12 of FIG. 1 is substantially the same using the hose segment 10 of FIG. 3 as it is with the hose segment 10 of FIG. 2. However, the water or other liquid or fluid flowing through flow channel 60 of the hose segment 10 of FIG. 3 is heated and prevented from freezing by the heat provided by heating element 56.

In this embodiment, the heating element 56 is preferably molded within the flexible inner elastomeric wall 40 of hose segment 10 adjacent flow channel 60, and can take the form of a narrow wire loop. Heating element 56 may include a substantially unheated low resistance portion 62 which may extend along the full length of the hose segment 10 and a high resistance heated wire portion 64 which extends parallel to the low resistance portion along the full length of the hose. Alternatively, the entire length of the looped heating element may be formed as a high resistance heating element.

The free ends of the heating element portions 62 and 64 are respectively electrically connected to the hot and neutral leads 34, 36 of power cord 32. A thermostat 66 is wired in series with the high resistance heater portion 64, while entire length of the loop formed by heating element 56 is wired in parallel with the leads 34, 36 of the power cord 32. If thermostat 66 opens due to excessive temperature in wall 40, power is prevented from flowing through heating element 56, but power will still be available at socket 44.

As further seen in FIG. 3, the lead wires 34, 36, 38 of power cord 32 are molded within a cylindrical foam-type insulation layer 70 which encircles and thermally insulates the inner hose wall 40 as well as heating element 56 and any fluid flowing through the flow channel 60 of hose segment 10. Layer 70 may be molded or otherwise applied over wall 40 in the form of a polyethylene foam.

Figure 4:
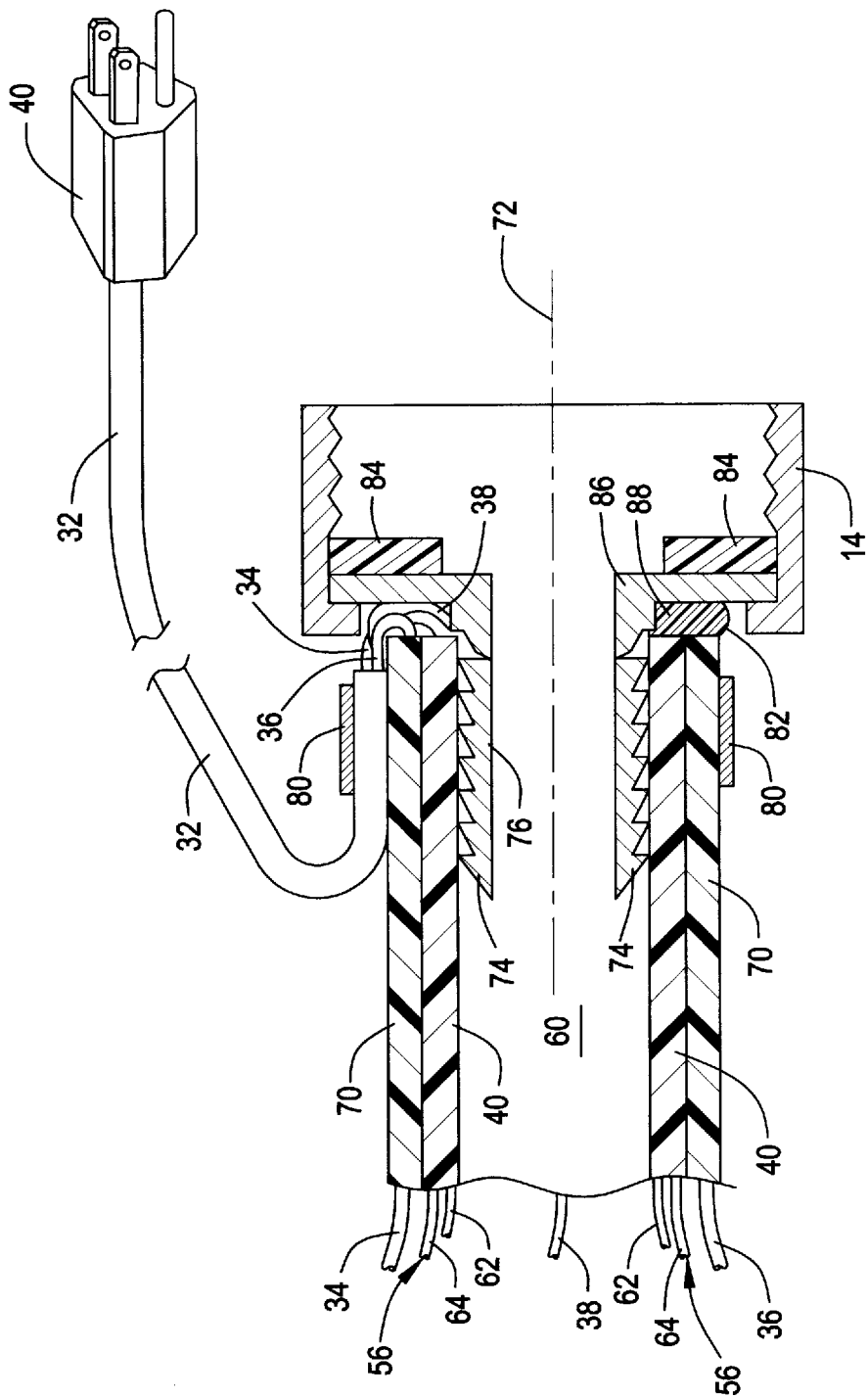
FIG. 4 is a partial view in central section through the female end of a hose constructed in accordance with another embodiment of the invention which includes a pair of heating elements.
Figure 5:
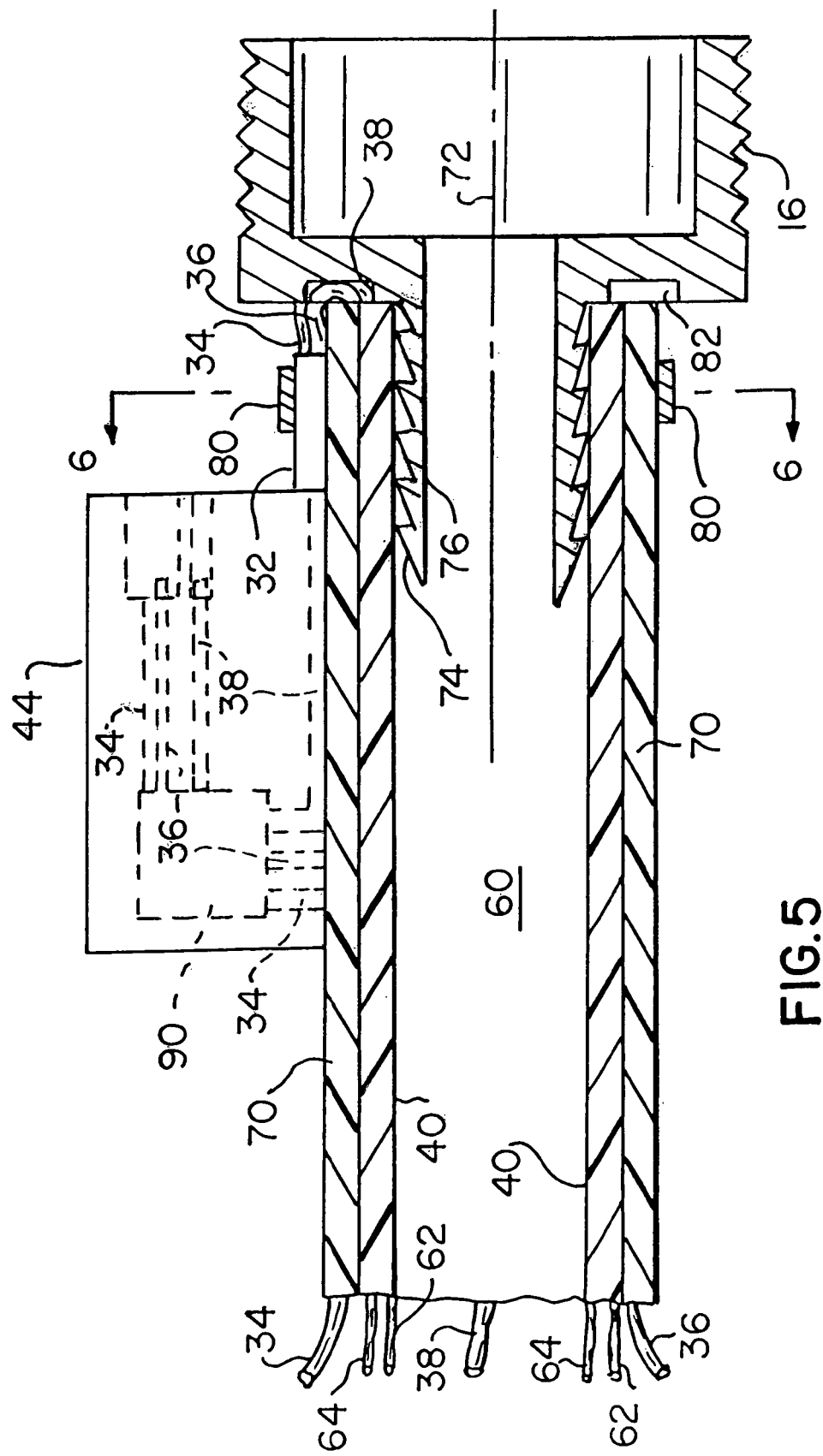
FIG. 5 is a partial view in central section through the male end of the hose of FIG. 4.
Figure 6:
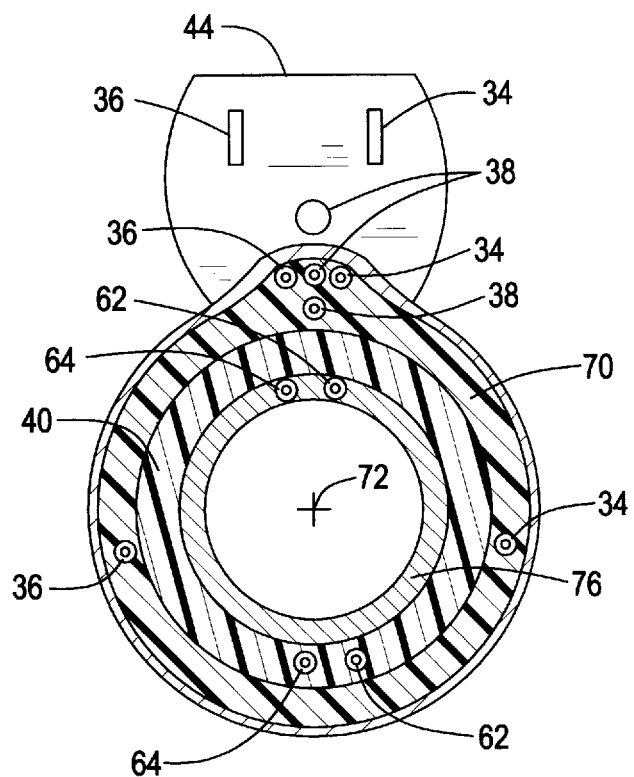
FIG. 6 is a view in section taken along line 6-6 of FIG. 5.

Another embodiment of the invention is shown in FIGS. 4, 5 and 6 wherein a hose segment 10 is provided with a pair of heating elements 56 each having a low resistance lead portion 62 and a high resistance lead portion 64 insert molded within hose wall 40. As shown, lead portions 62 and 64 are disposed parallel to one another and parallel to the longitudinal axis 72 of flow path 60. However, lead wire portions 62 and 64 can be arranged in a spiral pattern around axis 72 as an alternate construction.

Each heating element loop 56 is advantageously connected in a separate parallel electrical circuit with lead wires 34 and 36 in the manner as shown with the single heating element loop 56 shown in FIG. 3. In this case, if one heating element 56 burns out or is turned off by a thermostat 66, the other heating element 56 may be able to continue operating to keep fluid from freezing within flow channel 60.

As further seen in FIGS. 4, 5 and 6, the hot, neutral and optional ground leads 34, 36 and 38 are disposed generally parallel with one another and parallel with axis 72. Leads 34, 36 and 38 are shown circumferentially spaced apart within the annular insulation layer 70. These leads can be equally spaced 120 degrees apart, or at any other relative spacing. It is of course possible to arrange leads 34, 36 and 38 in a spiral pattern around axis 72.

While the lead wires 34, 36 and 38 are shown insert molded or extruded within the walls of insulation layer 70, it is also possible to simply lay the leads 34, 36 and 38 over the exterior or radially outer surface of hose wall 40, and then mold or otherwise apply insulation layer 70 over the lead wires 34, 36 and 38 so as to secure the lead wires along the interface between layer 70 and wall 40.

As seen in FIGS. 4 and 5, socket 14 and plug 16 are provided with axially-spaced radially-extending serrations or teeth 74 along the outer surface of a tubular anchor or plug portion 76. Plug portions 76 not only anchor the socket 14 and plug 16 to the inner ends of hose wall 40, they also provide an internal support for reacting compressive clamping forces from annular band clamps 80.

Band clamps 80 serve as strain reliefs as they clamp power cord 32 and leads 34, 36 and 38 firmly against the outer surface of insulation layer 70. Lead wires 34, 36 and 38 exit the end of each hose segment 10 adjacent an annular undercut 82 formed in the rear wall of each respective socket 14 and plug 16. A plastic or rubber annular washer 84 (FIG. 4) is shown provided against the wall 86 of socket 14.

A sealant 88 such as silicone rubber can be applied within and around the annular undercuts 82 to seal the connection between the plugs 76 and hose wall 40 and also cover and waterproof the lead wires 34, 36 and 38 at their exit points from insulation layer 70.

As seen in FIG. 5, female power connector 44 is shown mounted directly to the outer surface of insulation layer 70 by adhesives, for example. Tape or other attachment devices can also be used for this purpose. Power connector 44 is molded as a block of insulting material such as a plastic material. A ground fault interrupter (GFI) 90 of conventional design is insert molded into plug 44 and connected to lead wires 34, 36 and 38. Upon detecting an imbalance in current flow between leads 34 and 36, the GFI opens the circuit in hot lead 34 in a known fashion, thereby preventing any power from being delivered by power cord 32.

Figure 7:
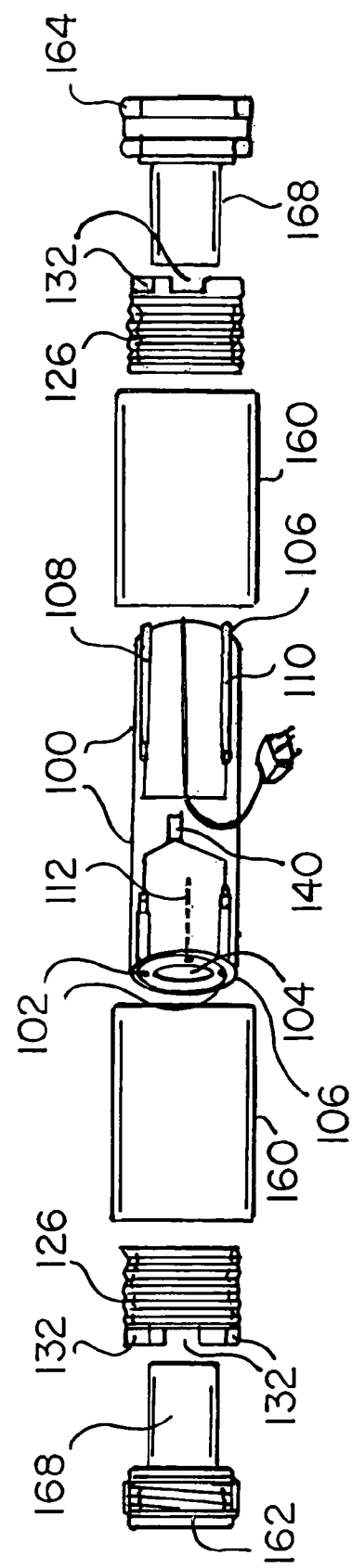
FIG. 7 is an axially-exploded view of another embodiment showing an electrical power and grounding system.
Figure 8:
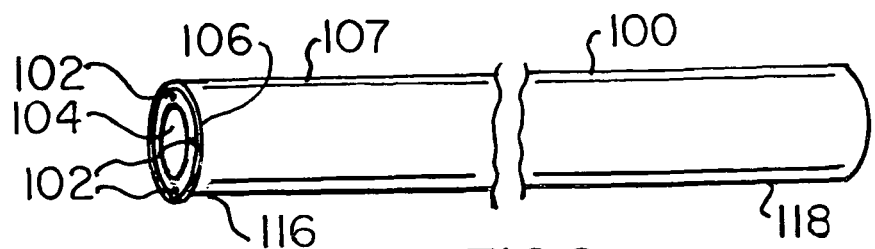
FIG. 8 is a side view of the hose of FIG. 7.
Figure 9:
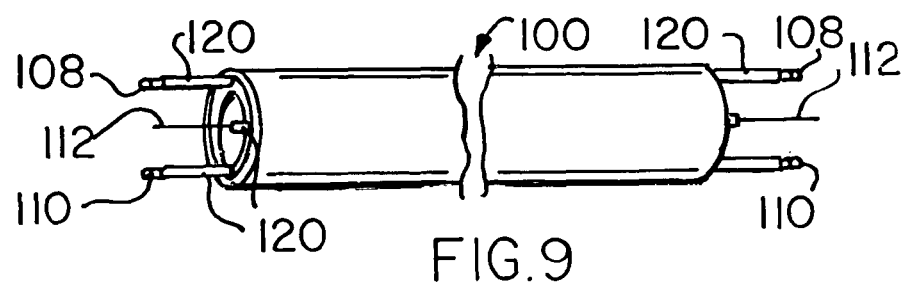
FIG. 9 is a view of FIG. 8 wherein the ends of the hose have been removed or "stripped" to expose three embedded wires.

Another embodiment of the disclosure is shown in FIGS. 7-15 wherein a safe, economical and sturdy electrical power and grounding circuit is formed in an easy-to-assemble heated hose construction. As seen in FIGS. 7, 8 and 9, a flexible hose body 100 is formed of a rubber or plastic material such as food grade PVC. The hose body 100 can be of any suitable length, such as forty to fifty feet long and can have any suitable internal flow path diameter, such as 5/8 inch.

In this embodiment, three heating elements in the form of PVC insulated copper-alloy wires 102 are linearly embedded within the inner wall 104 of the hose body 100 during an extrusion process. Other known methods can be used to embed or otherwise attach the wires to hose body 100. A tough, flexible outer plastic sheath 106 may be provided on the hose body 100 to protect and thermally insulate the hose body 100. When referring herein to the hose body 100, it is to be understood that the hose body can be formed as a single layer extrusion or as a double layer, such that the outer wall 107 of the hose body can be the outerwall of a single layer or multiple layer hose.

The copper alloy or other alloy heating wires 102 can be arranged as a pair of diametrically-opposed current-carrying heating wires such as "hot" wire 108 and "neutral wire" 110. A ground wire 112 can be located circumferentially midway between the heating wires 108, 110. Each wire can be parallel with each other and with the longitudinal axis of the hose body.

Once the hose body 100 is extruded or otherwise produced as shown in FIG. 8, the first and second opposite end portions 116, 118 of the hose body 100 are removed or "stripped" so as to expose several inches of each wire 108, 110, 112. In addition, a length of the insulation 120 on each wire 108, 110, 112 is removed to facilitate electric interconnections, as discussed below. In this embodiment, the stripped wires can have a diameter of about 1.9 millimeter and a resistance of about ten ohms per meter.

After the wires 108, 110, 112 have been stripped, a substantially rigid ring or ferrule 126 is placed over each end 116, 118 of the hose body 100. The rings 126 can be formed of thin-walled brass or other electrically conductive material. A series of axially-spaced circumferentially-extending ribs 128 can be formed on the outer surface of the rings 26 to form a secure seat for a later-applied cover or sheath, as noted below.

Figure 10:
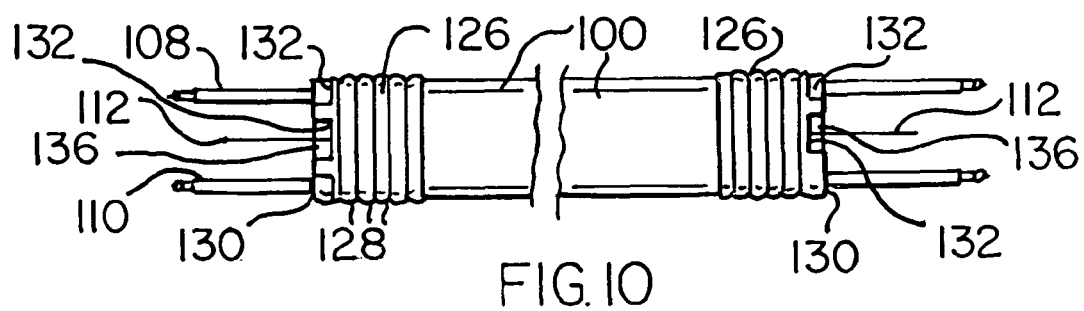
FIG. 10 is a view of FIG. 9 with rings or ferrules positioned over the ends of the hose.

Each ring 126 is formed with several axial notches 132 circumferentially-spaced around the outer edge 130 of each ring, as seen in FIG. 10. Two spaced-apart opposed notches 132 are circumferentially aligned over the hot wire 108 and neutral wire 110, and a third notch 132 can be located about midway between the substantially diametrically-opposed notches and aligned over the ground wire 112. A short radially-inwardly extending lip can be formed on each ring 126 to serve as an axial locator or stop cap to seat and secure each ring on each respective end portion of the hose body 100.

Figure 11:
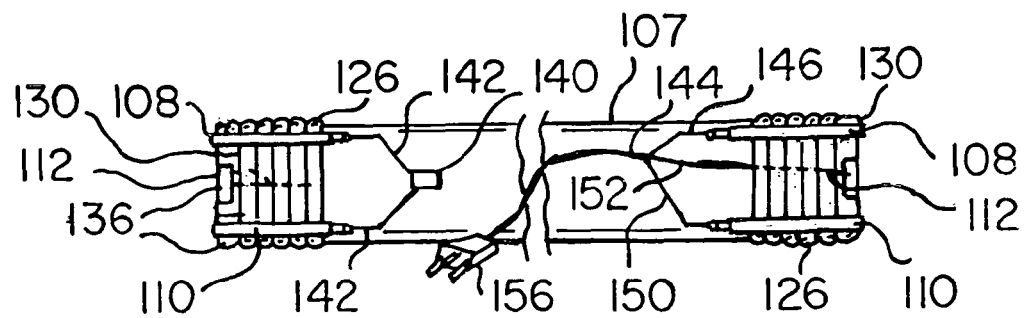
FIG. 11 is a view of FIG. 10 showing the insertion of the ends of a ground wire into the hose, the connection of a thermostat and power cord to the opposite ends of two heating wires and connection of the three wires to the power cord.

It should be noted that each notch 132 exposes an underlying portion 136 of the relatively soft material of the hose body 100. These exposed portions 136 serve as soft pockets or seats within which the wires 108, 110, 112 are folded as shown in FIG. 11. Aligning the wires within and over the notches 132 prevents the wires and their insulation from contacting the outer edges 130 of the rings 126 and thereby protects the wires from abrasions, wear and cutting against the outer edges 130.

As further seen in FIG. 11, a thermostat 140 has two electrical leads 142 connected to the stripped ends of the powered hot and neutral wires 108, 110, by soldering, crimping, butt splicing or any other conventional method. A power cord 144 has its hot wire 146, neutral wire 150 and ground wire 152 respectively connected to the hot wire 108, neutral wire 110 and ground wire 112 at the other end of the hose body 100 by soldering, crimping, butt splicing or any other conventional method. Power cord 144 further includes a conventional three-prong wall plug 156.

While the hot and neutral wires 108, 110 are folded or bent outwardly over the outer wall surface 107 of the hose body 100 for connection to the thermostat 140 and power cord 144, the ground wire 112 at the first end of the hose body 100 adjacent the thermostat 140 is folded or bent inwardly and axially into the flow channel or internal flow path of the hose body 100 and against its inner wall 104. The second end of the ground wire 112 is connected to the ground wire 152 on the power cord 144 and then bent or folded radially inwardly and axially into the flow path of the hose body 100, at its opposite or second end, with the power cord ground wire 152 aligned within a notch 132 in ring 126. The hot and neutral wires 108, 110 can also be disposed within respective notches 132. This alignment within the notches 132 provides a safe, protective, soft resilient seat 136 to secure the wires in place against the hose body 100.

Figure 12:
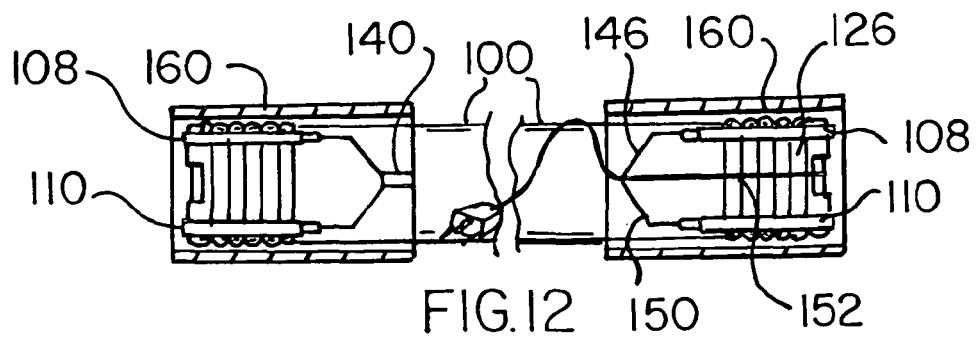
FIG. 12 is a view of FIG. 11 with heat-shrink sleeves positioned over each end of the hose.
Figure 13:
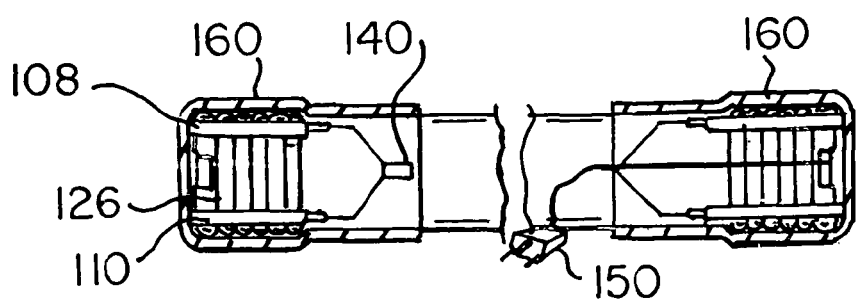
FIG. 13 is a view of FIG. 12 with the heat-shrink sleeves shrunk tightly over the heating wires, thermostat and power cord connections.

As seen in FIG. 12, once the electrical connections between the wires 108, 110 and 112 have been completed as described above, a protective sleeve or sheath 160 is positioned over each end portion of the hose body 100. In this embodiment, the sleeves 160 are polyolefin heat-shrinkable tubes having sufficient length to cover and encapsulate the exposed ends of the wires 108, 110, 112, the thermostat 140 and the connections between the power cord 144 and the wires 108, 110, 112. Heat is then applied to the sleeves 160 to shrink the sleeves tightly over the wires, thermostat and power cord to form a secure, protective watertight seal over the hose body 100, as seen in FIG. 13. The sleeves 160 securely clamp the wires 108, 110, 112 as well as the power cord wires 146, 150 and 152 against the rings 126.

Figure 14:
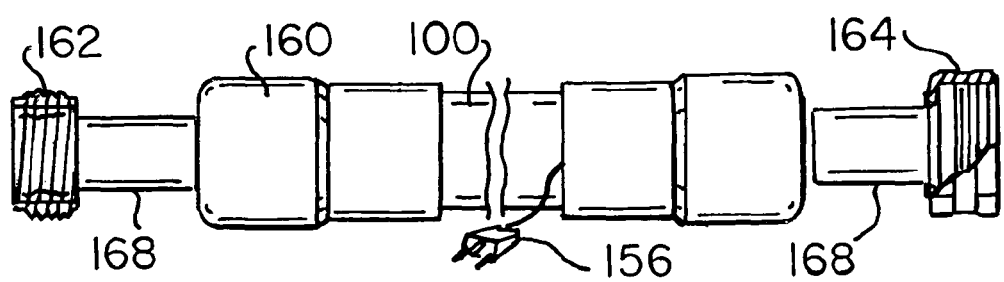
FIG. 14 is a view of FIG. 13 showing the insertion of hose couplings into opposite ends of the hose.

At this point, male and female fluid couplings are assembled to each end portion of the hose body 100 as shown in FIG. 14. In this embodiment, an externally-threaded male fluid coupling 162 is coupled to the first end of the hose body 100 and an internally-threaded female coupling 164 is coupled to the second end of hose body 100. Each fluid coupling 162, 164 includes an integral tubular axially-extending stem portion 168 which is dimensioned to fit snugly into the internal flow path of the hose body without excessive interference or force applied to the ends of the ground wires 112 which have been folded into opposite ends of the internal flow path.

Figure 15:
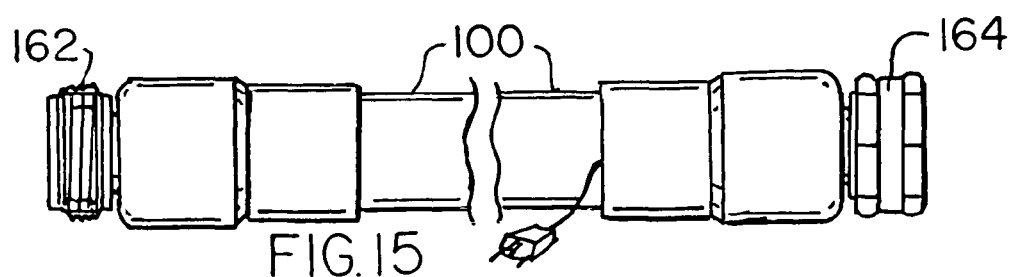
FIG. 15 is a view of FIG. 14 after the hose couplings have been secured to the ends of the hose and showing a completed hose assembly.

Once the stem portions 168 are fully inserted into the hose body 100 as shown FIG. 15, an expansion tool, such as an axially-tapered plug or mandrel is axially inserted into each coupling 162, 164 so as to radially-outwardly expand and plastically deform each stem portion 168 against the inner wall 104 of the hose body 100. This expansion of the stems 168 forces the ends of the ground wire 112 against and into the inner wall 104. The rings or ferrules 126 provide a reaction force against the radial expansion of the stems 168 of each fluid coupling 162, 164. This expansion also serves to securely anchor the rings or ferrules 126 onto the ends of the hose body 100.

In this manner, the mounting of the fluid couplings 162, 164 to the hose body 100 also completes an electrical connection between the couplings 162, 164 and the portion of the ground wire 112 that is folded into the flow channel or internal flow path of the hose body 100 and against its inner wall 104 at each end of the hose body 100. The fluid couplings 162, 164 and stems 168 are formed of brass in this example but can be formed of any other electrically conductive material. As described, a reliable sturdy electrical grounding circuit is formed along the entire length of the hose body 100 during the assembly of the fluid hose couplings 162, 164 to the hose body 100. Each of the fluid couplings 162, 164 forms a part of the grounding circuit and provides a secure robust interconnection with the ground wire 112.

There has been disclosed heretofore the best embodiment of the invention presently contemplated. However, it is to be understood that various changes and modifications may be made thereto without departing from the spirit of the invention.

The invention claimed is:

1. A method of forming a grounded electrical circuit in a heated hose, the heated hose comprising an inner wall, an outer wall, a first end portion, and a second end portion, the method comprising:
   positioning a ground wire, a first heating wire, and a second heating wire axially along the heated hose and within the inner wall;
   removing the first end portion and the second end portion of the heated hose, such that end portions of the first heating wire, the second heating wire, and the ground wire are exposed;
   positioning a ring around the first end portion of the hose;
   folding, at the first end portion of the hose, the exposed end portions of the first heating wire and the second heating wire radially outward, such that the exposed end portions are positioned axially along an outer surface of the hose body;
   folding, at the first end portion of the hose, the exposed end portion of the grounding wire radially inward, such that the exposed end portion of the grounding wire is positioned axially along an inner surface of the inner wall and against the ring; and
   inserting a stem of a first fluid coupling into the first end portion of the heated hose, such that the stem contacts the exposed end portion of the grounding wire.

2. The method of claim 1, further comprising removing a length of insulation along each wire in order to expose the wire.

3. The method of claim 1, further comprising attaching a thermostat to the exposed end portions of the first and the second heating wires at the first end portion of the heated hose.

4. The method of claim 3, further comprising:
   positioning a ring around the second end portion of the hose;
   folding, at the second end portion of the hose, the exposed end portions of the first heating wire and the second heating wire radially outward, such that the exposed end portions are positioned axially along an outer surface of the hose body;
   folding, at the second end portion of the hose, the exposed end portion of the grounding wire radially inward, such that the exposed end portion of the grounding wire is positioned axially along an inner surface of the inner wall and against the ring; and
   inserting a stem of a second fluid coupling into the second end portion of the heated hose, such that the stem contacts the exposed end portion of the grounding wire.

5. The method of claim 4, further comprising attaching a power cord to the exposed end portions of the first heating wire, the second heating wire, and the ground wire at the second end portion of the heated hose.

6. The method of claim 5, further comprising inserting an expansion tool into the first fluid coupling and the second fluid coupling to radially-outwardly expand each stem against the inner wall of the hose and contact the exposed end portion of the grounding wire.

7. The method of claim 1, further comprising positioning a protective sheath over each end portion of the hose to protect the exposed end portions of the first heating wire, the second heating wire, and the grounding wire.

* * * * *